United States Patent [19]
Tucker

[11] Patent Number: 5,460,042
[45] Date of Patent: Oct. 24, 1995

[54] ADJUSTABLE MEASURING DEVICE

[76] Inventor: Terence Tucker, 1031-D Calle Trepadora, San Clemente, Calif. 92673-6204

[21] Appl. No.: 226,681

[22] Filed: Apr. 12, 1994

[51] Int. Cl.$^6$ ................................................. G01F 19/00
[52] U.S. Cl. .............................................. 73/429; 73/426
[58] Field of Search ............................. 73/426, 427, 428, 73/429; 33/524; D10/46.2

[56] References Cited

U.S. PATENT DOCUMENTS

| D. 253,869 | 1/1980 | Wells | D10/46.2 |
|---|---|---|---|
| 2,034,733 | 3/1936 | Wilkins | 73/426 |
| 2,389,530 | 11/1945 | Miner | 73/426 |
| 2,396,943 | 3/1946 | Frank . | |
| 2,496,268 | 2/1950 | Chester | 73/429 |
| 2,555,956 | 6/1951 | Chester | 73/429 |
| 2,569,703 | 10/1951 | Weiland | 73/429 |
| 2,626,526 | 1/1953 | Chester . | |
| 2,697,353 | 12/1954 | Setecka . | |
| 2,854,849 | 10/1958 | Setecka | 73/429 |
| 3,690,182 | 9/1972 | Rodriguez | 73/429 |
| 3,798,975 | 3/1974 | Horst | 73/429 |
| 5,182,948 | 2/1993 | Robbins et al. | 73/426 |

FOREIGN PATENT DOCUMENTS 649068 10/1948 United Kingdom .

Primary Examiner—Thomas B. Will
Attorney, Agent, or Firm—Stetina Brunda & Buyan

[57] ABSTRACT

Adjustable measuring devices are disclosed. The device comprises an elongate body having first and second ends. Both first and second ends have measuring cavities formed thereon. Preferably the body member further has a central rail member disposed between the measuring cavities formed at each end of the member. Slidably attached to the body member is an elongate central cover member. The central cover member has damming members extending downwardly at each end such that each damming member is snugly received within a measuring cavity. Accordingly, by sliding the central cover member across the body member, the volume in each respective measuring cavity can be increased or decreased to form a desired setting. Preferably, the adjustable measuring device has measuring indicia formed thereon as well as an adjustable interlocking arrangement between the central cover member and the body member such that fixed volumes may be readily and accurately measured. Additionally, slots running lengthwise into each measuring cavity are provided so as to facilitate cleaning of the adjustable measuring device. Furthermore, the central cover member is designed to be snap-mounted onto the body member such that the central cover member and body member are maintained in permanently connected condition.

16 Claims, 3 Drawing Sheets

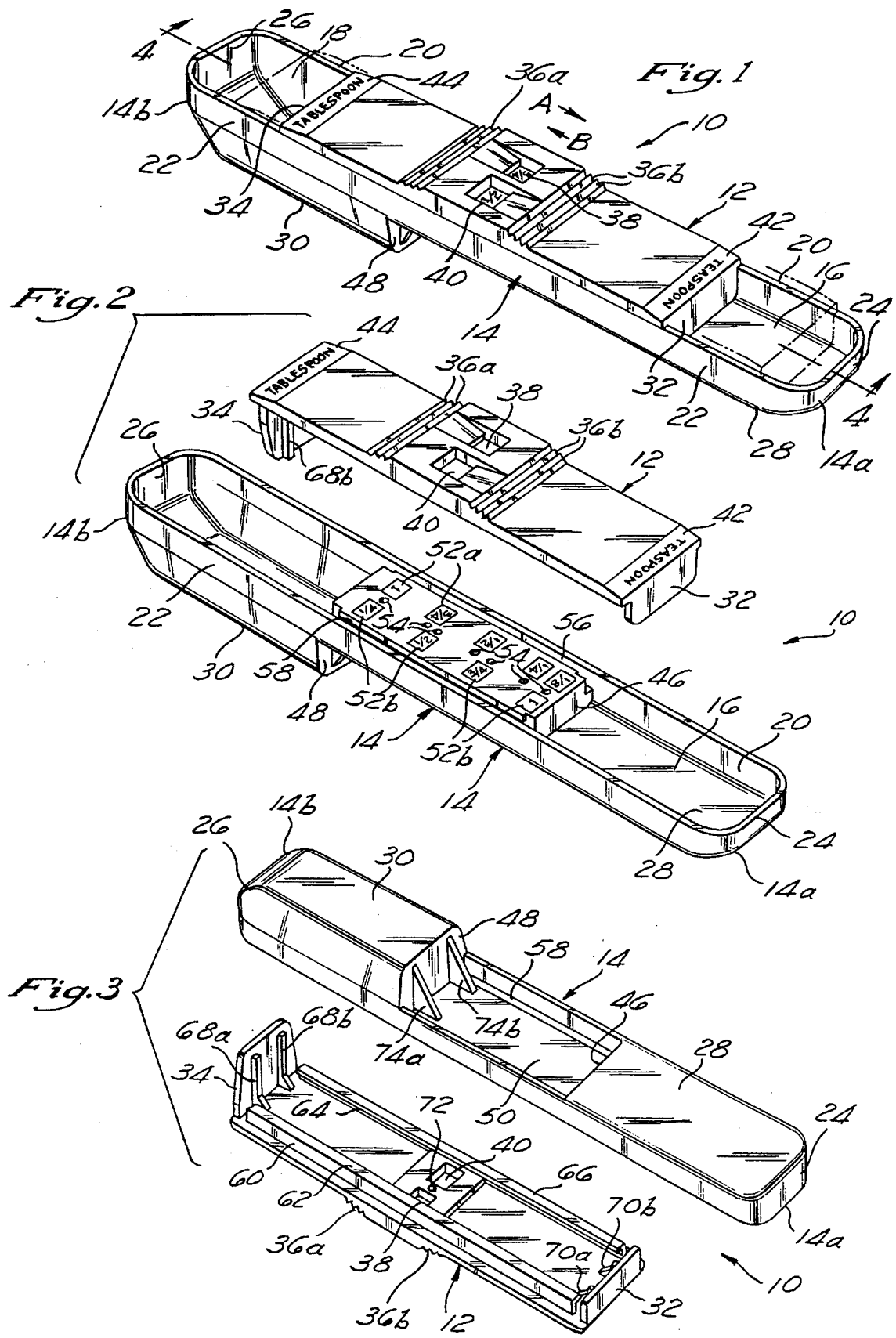

ADJUSTABLE MEASURING DEVICE

FIELD OF THE INVENTION

The present invention relates generally to measuring devices, and more particularly to measuring devices having manually adjustable volumes.

BACKGROUND OF THE INVENTION

Adjustable measuring devices are well known to those skilled in the art. Generally, such devices include a bowl or spoon cavity with a member extending therein that can be manipulated to set the bowl or spoon cavity to the desired volume. Typical of such adjustable measuring devices is U.S. Pat. No. 5,182,948 to Robbins et al.

However, such adjustable measuring devices generally in use have several drawbacks. While providing means for measuring a variety of volumes, such devices typically have only one measuring cavity in which to measure a given substance, such as spices or sugar. Additionally, such adjustable measuring devices generally do not have measuring containers that are calibrated to one specific standard volume reference, such as the teaspoon or tablespoon. As a result, such adjustable measuring devices generally in use provide less accuracy than traditional, non-adjustable measuring containers and further require the users of such adjustable devices to take significantly more caution to ensure that the correct amount is measured.

Accordingly, it would be desirable to provide an adjustable measuring device that provides for more than one measuring cavity. Additionally, it would be desirable to provide an adjustable measuring device having measuring cavities that are specifically calibrated to one type of measuring reference. Furthermore, it would be desirable to provide an adjustable measuring device that is exceedingly simple to use and to keep clean.

SUMMARY OF THE INVENTION

The present invention specifically addresses and alleviates the above-mentioned deficiencies. More particularly, the present invention is directed to an adjustable measuring device comprising the combination of an elongate body member and an elongate central cover member. The elongate body member has first and second ends wherein each end has a measuring cavity formed thereon. Each of the respective measuring cavities is calibrated to a different measuring reference. For example, one measuring cavity will be designed to measure a teaspoon and various fractions thereof, while the other measuring cavity will be designed to measure a tablespoon and various fractions thereof.

The central cover member has first and second ends wherein each end has a damming member depending therefrom. The central cover member is slidably mounted upon the body member such that each damming member is received within a respective measuring cavity. The damming members are shaped and designed to form a snug fit into the measuring cavity in which it is received. Accordingly, by sliding the central cover member along the body member, the volume in each respective measuring cavity will be adjusted by virtue of the movement of the damming member within each respective measuring cavity.

In a preferred embodiment, the body member has a central rail member disposed between the measuring cavities. Additionally, the central cover member will have flanges extending downwardly therefrom to slidingly engage the central rail member. In a most preferred embodiment, the flanges have inwardly facing, barb-shaped detents that, by virtue of the frictional fit between the detents and the central rail member, maintain the central cover member and body member in permanently connected condition.

In addition to the foregoing, the adjustable measuring device of the present invention further provides for measuring indicia, preferably formed upon the central member and viewable through the central cover member, such that the user will be easily able to adjust the measuring device to the desired volume. Additionally, there is also preferably provided a plurality of apertures formed on the central rail member and a protuberance formed on the bottom surface of the central cover member to engage a respective one of such apertures, the engagement of which corresponds to a given volume created by a damming member within a respective measuring cavity. By providing such interlocking engagement between the protuberance and plurality of apertures, a user will be more easily able to correctly position the sliding member such that a desired volume may be formed.

In order to facilitate cleaning, the adjustable measuring device of the present invention further includes longitudinally extending slots that extend lengthwise across either side of the central rail member and into each respective measuring cavity. The slots are shaped and designed to allow water and detergent to penetrate therethrough so that each respective measuring cavity may be thoroughly cleaned.

It is therefore an object of the present invention to provide an adjustable measuring device having more than one measuring cavity wherein each measuring cavity is calibrated to a different measuring reference volume.

Another object of the present invention is to provide an adjustable measuring device that is extremely simple to use and may be readily manipulated to form a desired volume.

Another object of the present invention is to provide an adjustable measuring device that can be easily and thoroughly cleaned without requiring a user to disassemble the measuring device.

These, as well as other further advantages, will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of an adjustable measuring device according to a preferred embodiment of the present invention;

FIG. 2 is an exploded top view of the adjustable measuring device;

FIG. 3 is an exploded bottom view of the adjustable measuring device;

DETAILED DESCRIPTION OF THE PREFERRED EMBODIMENT

Figure 4:
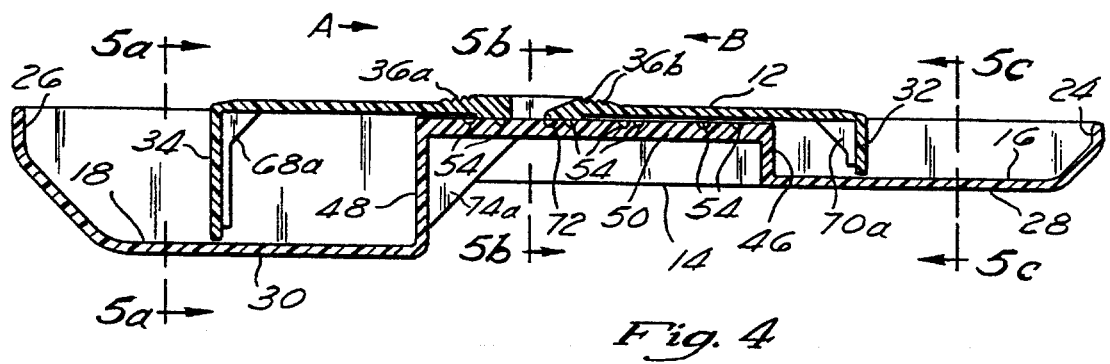
FIG. 4 is a cross-sectional view taken along line 4—4 of FIG. 1.

Referring to FIGS. 1–5d, and more particularly to FIG. 1, there is shown an adjustable measuring device 10 according to a first preferred embodiment of the present invention. The device 10 comprises the combination of body member 14 and central cover member 12. The central cover member 12 is slidably attached to the body member 14 such that the central cover member 12 may be moved in the directions indicated by "A" and "B".

The elongate body member 14 has a first end 14a and a second end 14b. Formed at the first end 14a is first measuring cavity 16. The first measuring cavity 16 is formed by side walls 20 and 22, first front end wall 24, first bottom surface 28, and first damming member 32, the latter extending downwardly from the central cover member 12.

The second measuring cavity 18, which is formed on the second end 14b of the body member 14, is defined by first side walls 20 and 22, second front wall 26, bottom bowl-type portion 30, and second damming member 34, the latter, like first damming member 32, depending from the central cover member 12.

Disposed upon the top surface of the central cover member 12 are frictional surfaces 36a,b that provide a surface upon which the user may exert a sliding force. Additionally disposed upon the top portion of the central cover member 12 are first and second indicia apertures 38,40 which advantageously allows the user to view and select a desired volume. Accordingly, each indicia aperture 38,40 relates to a specific one of the measuring cavities 16,18. First indicia aperture 38 corresponds to the volume created in the first measuring cavity 16 whereas second indicia aperture 40 dictates the volume in the second measuring cavity 18. In order to insure that the user has properly adjusted the measuring device such that the correct measuring cavity has been adjusted, orientation markers 42,44 are provided at the ends of the central cover member 12 so as to clearly indicate to the user which cavity has been measured. As shown, the indicia appearing through first indicia aperture 38 is oriented toward orientation marker 42 (i.e., teaspoon) while indicia appearing through the second indicia aperture 40 corresponds to .the second orientation marker 44 (i.e., tablespoon).

Referring now to FIG. 2, there is shown a top exploded view of the adjustable measuring device 10. The central cover member 12 is shaped and designed to be permanently mounted onto the elongate body member 14. Once the central cover member 12 is permanently attached to the body member 14, preferably by a frictional fit depicted in FIGS. 5b and 5d between the central cover member 12 and body member 14, the central cover member 12 may then be slidably moved longitudinally in the directions "A" and "B" as shown in FIG. 1. The central cover member 12 has first and second damming members 32,34 that are to be received within the respective measuring cavities 16,18. More specifically, first damming member 32 is received within first measuring cavity 16 whereas second damming member 34 is received within the second measuring cavity 18.

In a preferred embodiment, the body member 14 has a central rail member 50 disposed between the first measuring cavity 16 and second measuring cavity 18. At either end of the central rail member 50 are walls 46,48. These walls 46,48 form the rear, back-most portions of the respective measuring cavities 16,18. More specifically, rear wall 46 provides the back-most portion of the first measuring cavity 16 whereas the second rear wall 48 provides the back-most portion of the second measuring cavity 18.

Preferably, the measuring indicia for each measuring cavity 16,18 is formed upon a central rail member 50. Indicia is provided for each measuring cavity 16,18 and is positioned such that the indicia may be viewed from either the first indicia aperture 38 or second indicia aperture 40. The first measuring indicia 52a corresponds to the volumes generated in the first measuring cavity 16 whereas the second measuring indicia 52b corresponds to volumes generated in the second measuring cavity 18. In order to insure that the central cover 12 has been positioned correctly such that the desired volume is formed in a respective cavity 16,18, there is further provided a plurality of apertures 54 that are formed upon the central rail member 50. Formed upon the bottom surface of the central cover member 12 is protuberance 72, shown in FIG. 3, which is shaped and designed to detachably interlock with a respective one of the plurality of apertures 54. Accordingly, by sliding the central cover member 12 to a position whereby the protuberance engages a respective one of the apertures 54, the user may thus be able to accurately position the central cover member 12 to a desired standardized setting.

In a most preferred embodiment, slots 56,58 are further provided. These slots 56,58 extend longitudinally about either side of the central rail member 50 and extend into the rear portions of each measuring cavity 16,18. Advantageously, these slots provide means for allowing the central cover member 12 to be attached to the body member 14, the attachment being more clearly depicted in FIGS. 5b and 5d. Additionally, these first and second slots 56,58 provide means whereby water and detergent may be able to enter the respective measuring cavities 16,18 such that the cavities 16,18 may be thoroughly cleaned. Accordingly, by providing such first and second slots 56,58, the user will not be required to disassemble the adjustable measuring device 10, as all parts of the device will be accessed by the necessary cleaning agents.

Referring now to FIG. 3, there is shown a bottom exploded view of the adjustable measuring device 10. Extending lengthwise from the central cover member 12 are first and second flanges 60,64. These first and second flanges 60,64 preferably provide the necessary attachment and sliding engagement with the body member 14. More specifically, the first and second flanges 60,64 preferably extend through first and second slots 56,58 and snugly compress against central rail member 50. In a most preferred embodiment, both first and second flanges 60,64 have inwardly-facing, barb-shaped detents 62,66 formed thereon. These inwardly-facing, barb-shaped detents 62,66 are more clearly seen in FIG. 5b, with second barb-shaped detent 66 being greatly enlarged in FIG. 5d. These first and second barb-shaped detents 62,66 are substantially equal in length to flanges 60,64 such that each flange 60,64 and detent 62,66 cooperate to form a substantially square shoulder. These square-like shoulders advantageously provide means for rigidly securing the central cover member 12 onto the body member 14 such that the central cover member 12 and body member 14 are maintained in permanently connected condition.

In order to provide support to the adjustable measuring device 10, numerous support members are provided to add extra strength. In particular, support members 68a,68b provide additional support to second damming member 34 while support members 70a,70b provide added strength to the first damming member 32. Also provided are support members 74a,74b which add strength and support to rear wall 48 of the second measuring cavity 18.

Referring now to FIG. 4, a cross-sectional view of the measuring device 10 is shown. The central cover member 12 is disposed upon and slidably attached to the body member 14. Accordingly, by sliding the central cover member 12 in the direction indicated by "A" and "B", the volumes of each respective measuring cavity 16,18 may be adjusted. By moving the central cover member 12 in the direction indicated by the letter "A", the first measuring cavity 16 will have a correspondingly decreasing volume whereas the second measuring cavity 18 will have a correspondingly increasing volume. The opposite is true when the central cover member 12 is moved in the direction indicated by the letter "B". The maximum volume attained in either measuring cavity will occur when the central cover member 12 is pushed in either direction such that the support members 70a,68a of the first and second damming members 32,34 will abut the respective rear wall 46,48 of the measuring cavities 16,18 in which support members 70a, 68a are received.

Figures 5A, 5B, 5C:
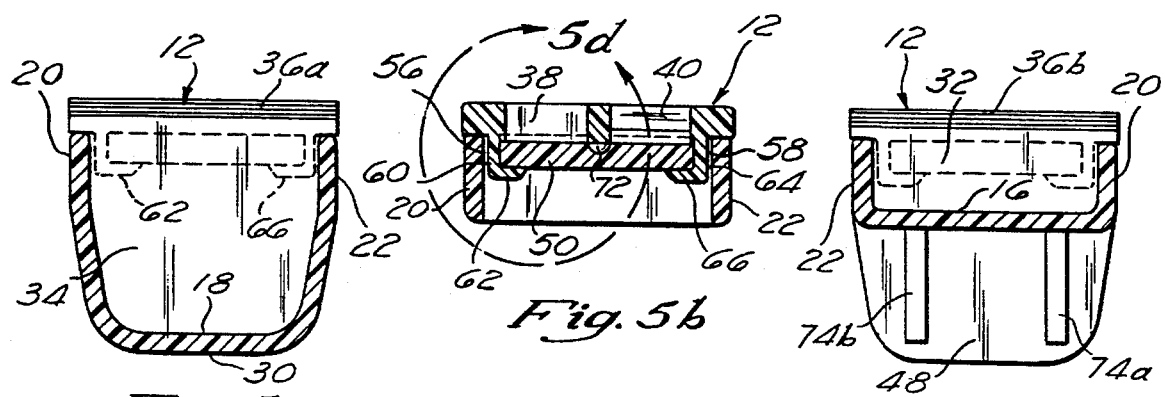
FIG. 5a is a cross-sectional view taken along line 5a—5a of FIG. 4.
FIG. 5b is a cross-sectional view taken along line 5b—5b of FIG. 4.
FIG. 5c is a cross-sectional view taken along line 5c—5c of FIG. 4.

FIG. 5a depicts a cross-sectional view of the second measuring cavity 18. The second damming member 34 may be longitudinally advanced or retracted so as to achieve the desired volume. The second measuring cavity 18 will preferably be calibrated to form various portions of a measuring standard other than the first measuring cavity 16. In a preferred embodiment, the second measuring cavity 18 will correspond to a single tablespoon and various fractions thereof, including, but not limited to, ¼th, ½, and ¾ths. Accordingly, the second measuring indicia 52b and apertures 54 will provide for the formation and indication of such portions.

FIG. 5c depicts a cross-sectional view of the first measuring cavity 16. Similar to the second measuring cavity 18, first damming member 32 may be advanced or retracted so as to achieve a desired volume. First measuring cavity 16 will also be calibrated to form a measuring standard, and various fractions thereof, other than that of the second measuring cavity 18. In a most preferred embodiment, the first measuring cavity 16 will be calibrated to measure a teaspoon and various fractions thereof including, but not limited to, ⅛th, ¼th, ½, and ¾ths. Accordingly, indicia 52a and apertures 54 will be provided to form such volumes as well as indicate the same.

Referring to FIG. 5b, there is shown the arrangement by which the central cover member 12 is attached to body member 14. The central cover member 12 is forced downwardly upon body member 14 such that the first and second flanges 60,64 extend through first and second slots 56,58 whereby the first and second flanges 60,64 deform around and fit about central rail member 50. Preferably, inwardly extending detents 62,66, having a barb configuration, are provided to insure non-disengageable attachment.

Figure 5D:
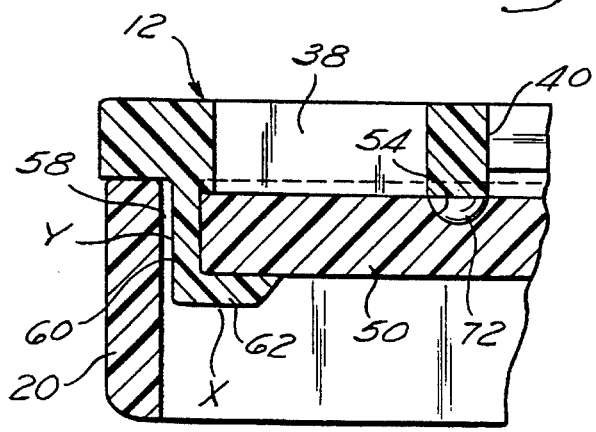
FIG. 5d is an enlarged view taken along area 5d of FIG. 5b.

FIG. 5d more closely illustrates this engagement between central cover member 12 and body member 14. The frictional fit between second flange 64, with inwardly extending detent 66, and central rail member 50 illustrates how the central cover member 12 remains slidably attached to the body member 14 while maintaining both central cover member 12 and body member 14 in permanently connected condition. The detent 66 (as well as detent 62, not shown) has a length, depicted by the letter "X", that is substantially equal in length to that of flange 64 (and flange 60, not shown), depicted by the letter "Y". The detent 66 protrudes from flange 64 such that a substantially square-like shoulder is formed. As mentioned above, the central cover member 12 is placed upon the body member 14 such that flanges 60,64 and detents 62,66 are aligned with and forced through slots 56,58. Accordingly, each square-like shoulder, formed by each flange and detent 60,62 and 64,66, deforms around and, ultimately, fits about the central rail member 50 as depicted.

Furthermore, there is shown in FIG. 5d, the arrangement by which downwardly-extending protuberance 72 engages a respective one of the plurality of apertures 54 formed on the upper surface of the central rail member 50. Accordingly, by sliding the central cover member 12 such that the protuberance 72 engages a respective one of the plurality of apertures 54, the volume of a respective measuring cavity 16,18 will be readily formed. Additionally, the resulting volume formed by positioning the central cover member 12, as mentioned, will correspondingly align the central cover member 12, such that measuring indicia 52a,52b may be viewed from the first indicia aperture 38 or second indicia aperture 40, depending upon which measuring cavity 16,18 is being utilized.

Figure 6:
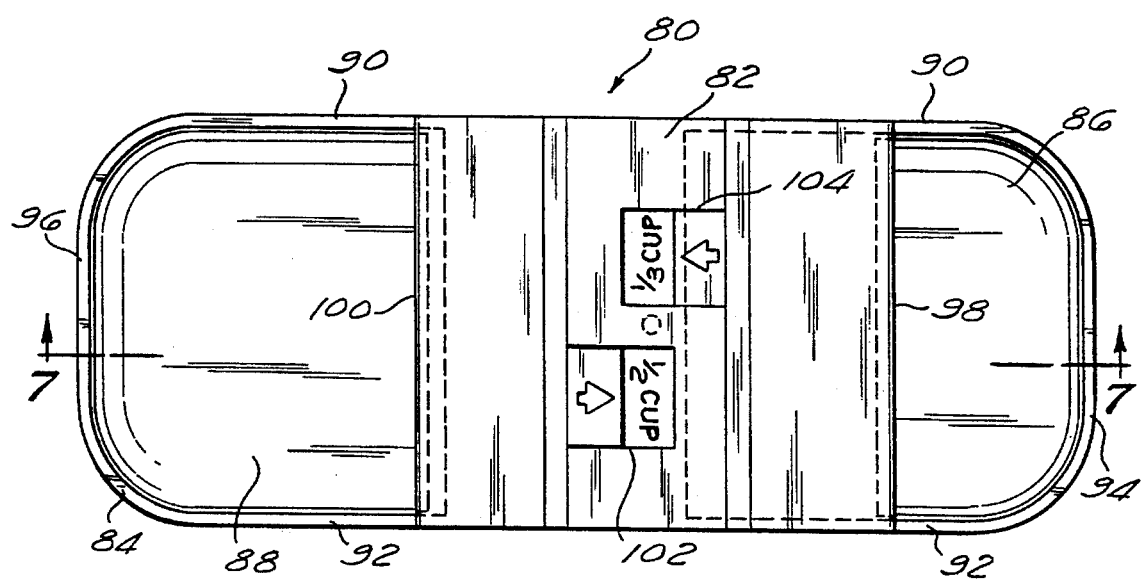
FIG. 6 is a top view of a second embodiment of the adjustable measuring device.
Figure 7:
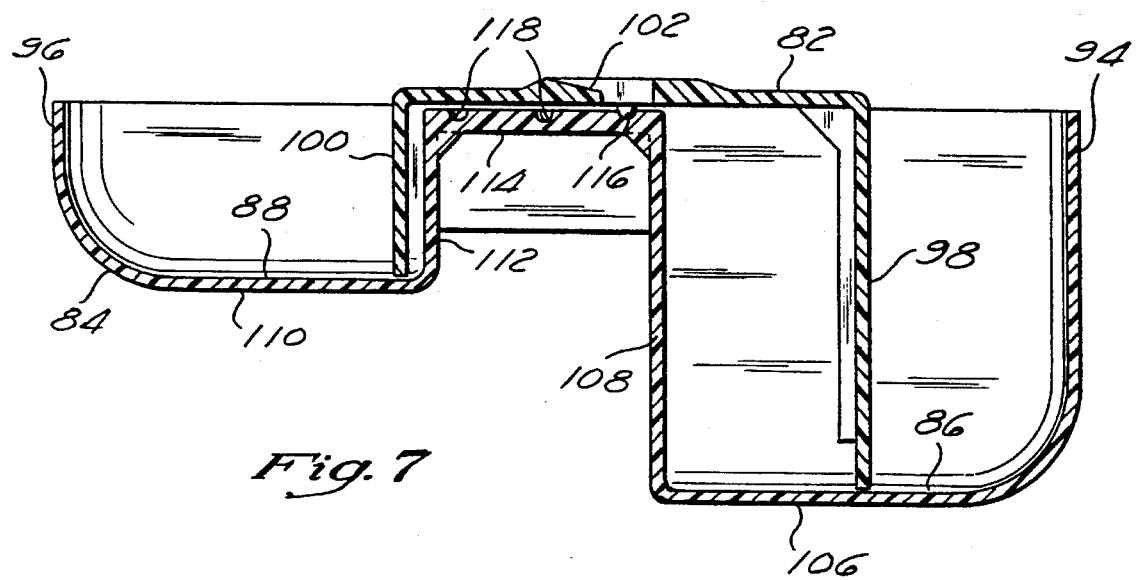
FIG. 7 is a cross-sectional view taken along line 7—7 of FIG. 6.

Referring now to FIGS. 6 and 7, and more particularly FIG. 6, there is shown an adjustable measuring device according to a second preferred embodiment 80 of the present invention. The second preferred embodiment 80 incorporates the same structural arrangement as the first embodiment 10, the teachings of which are incorporated herein by reference. The second preferred embodiment 80 incorporates the combination of a central cover member 82 that is slidably attached to body member 84. The body member 84 has a first measuring cavity 86 disposed at one end and a second measuring cavity 88 disposed at the opposite end. The first measuring cavity 86 is defined by first side wall 90, second side wall 92, front end wall 94, and, referring to FIG. 7, first bowl portion 106 and first rear wall 108. The second measuring cavity 88 is defined by first side wall 90, second side wall 92, front end wall 96, and, referring to FIG. 7, second bowl portion 110 and second rear wall 112.

In contrast to the first embodiment, the first and second measuring cavities 86,88 are designed to have a larger measuring capacities and, as such, are designed to measure larger volumes.

However, while the volumes of the measuring cavities 86,88 are larger, the same structural arrangement, as mentioned above, it utilized. The central cover member 82 has a first damming member 98 extending downwardly into the first measuring cavity 86 and a second damming member 100 that extends downwardly into the second measuring cavity 88. The arrangement by which the damming members 98,100 extend into the measuring cavities 86,88 is clearly depicted in the cross-sectional view of FIG. 7.

In order to accurately indicate to the user the volume of each respective measuring cavity 86,88, first indicia aperture 102 and second indicia aperture 104 are provided. Accordingly, the user may be able to accurately adjust the central cover member 82, by viewing the measuring indicia through said apertures 102,104, such that a desired volume is formed in either one of the respective measuring cavities 86,88.

Additionally, the body member 14 of the second embodiment 80 preferably incorporates the use of a central rail member 114, as shown in FIG. 7, upon which the central cover member 82 is slidably attached. The engagement by which the central cover member 82 engages the central rail member 114 is the same as the engagement between central member 12 and central rail member 50 of the first embodiment 10, as more clearly shown in FIGS. 5b and 5d. Furthermore, the central cover member 82 preferably incorporates a downwardly-extending protuberance 116 to engage a plurality of apertures 118 that are formed on the top surface of the central rail member 114. This interlocking arrangement, which is similar to that of the engagement between protuberance 72 and the plurality of apertures 54 of the first embodiment 10, provides means for accurately positioning the cover members such that an accurate volume may be readily measured.

There has thus been provided an adjustable measuring device capable of quickly and easily measuring a given volume in a respective one of two measuring cavities. It should be understood that various modifications within the scope of this invention can be made by one of ordinary skill in the art without departing from the spirit thereof. We therefore wish our invention to be defined by the scope of the appended claims as broadly as the art will permit, and in view of the specification if need be.

What is claimed is:

1. An adjustable measuring device comprising:
   a) an elongate body member having first and second ends, said first end having a first measuring cavity formed thereon, said second end having a second measuring cavity formed thereon, said body member having a central rail portion disposed intermediate said first and second measuring cavities, with the top edges of said first and second measuring cavities and said rail portion being disposed in a substantially common plane;
   b) an elongate cover member slidably mounted to said rail portion having damming members depending downwardly from opposite ends thereof, said elongate central cover member having a lower surface adapted to contact said top edges of said first and second measuring cavities and said rail portion;
   c) at least one slot formed along the length of said rail portion; and
   d) at least one flange depending from said central cover member, said at least one flange being sized and adapted to be received in said at least one slot to retain said cover member on said body member and allow said central cover member to slidably move along said top edges of said first and second measuring cavities and said rail portion such that by sliding said cover member, said damming members correspondingly adjust the volume of each respective measuring cavity.

2. The adjustable measuring device of claim 1 wherein said at least one flange is slidably attached to said central rail portion in a non-removable fashion.

3. An adjustable measuring device comprising:
   a) a body member having first and second ends, said first end having first and second side walls, a front wall, a bottom wall and a rear wall, said side walls, front wall, bottom wall and rear wall of said front end defining a first measuring cavity, said second end having first and second side walls, a front wall, a bottom wall and a rear wall, said side walls, front wall, bottom wall and rear wall of said second end defining a second measuring cavity, said body member having a rail member disposed intermediate said first and second measuring cavities, wherein the top edges of said rail member and said side walls and front walls of each respective measuring cavity are disposed in a generally common plane; and
   b) a central cover member slidably mounted upon said body member, said central cover member having a first damming member extending downwardly into said first measuring cavity, said central cover member having a second damming member extending downwardly into said second measuring cavity, said central cover member having a lower surface adapted to contact said top edges of said rail member and said side walls of said first and second measuring cavities;
   c) wherein the volumes of each respective measuring cavity may be manually adjusted by sliding said central cover member along said body member.

4. The adjustable measuring device of claim 3 wherein said rail member is a central rail member disposed intermediate said first and second measuring cavities.

5. The adjustable measuring device of claim 4 wherein said central cover member has at least one flange depending therefrom for slidably engaging with said central rail member.

6. The adjustable measuring device of claim 5 wherein said central cover member has two flanges depending therefrom for slidably engaging with said central rail member.

7. The adjustable measuring device of claim 6 wherein said flanges have inwardly facing detents that engage said central rail member.

8. The adjustable measuring device of claim 7 wherein said inwardly facing detents maintain said central cover member and said body member in permanently connected condition.

9. The adjustable measuring device of claim 4 wherein said central rail member has measuring indicia formed thereon, said measuring indicia corresponding to the volume created by a damming member received within a measuring cavity.

10. The adjustable measuring device of claim 9 wherein said central rail member has two series of measuring indicia, each respective series of indicia corresponding to a respective one of said measuring cavities.

11. The adjustable measuring device of claim 9 wherein said central cover member has at least one aperture to allow the indicia to be viewed.

12. The adjustable measuring device of claim 10 wherein said central cover member has two apertures formed thereon, each respective aperture being aligned with a respective one of said two series of measuring indicia.

13. The adjustable measuring device of claim 5 wherein:
   a) said central rail member has a plurality of apertures formed thereon; and
   b) said central cover member has a protuberance extending downwardly toward said central rail member, said protuberance being sized and adapted to be snugly received within a respective one of said plurality of apertures, said protuberance being aligned so as to engage each respective one of said plurality of apertures;
   c) wherein said central cover member is slidably movable such that said protuberance is engageable with each respective one of said plurality of apertures, said engagement between said protuberance and a respective one of said plurality of apertures providing reference means corresponding to a fixed volume created between a damming member and the measuring cavity in which the damming member is received.

14. The adjustable measuring device of claim 13 wherein said plurality of apertures and interlocking protuberance are aligned with measuring indicia formed upon said central rail member such that when said protuberance is received within a respective one of said plurality of apertures, said indicia indicates the corresponding volume created between a damming member and the respective measuring cavity in which the damming member is received.

15. An adjustable measuring device comprising:
   a) a body member having first and second ends, said first end having first and second side walls, a front wall, and a rear wall, said side walls, front wall, and rear wall of said front end defining a first measuring cavity, said second end having first and second side walls, a front wall, and a rear wall, said side walls, front wall, and rear wall of said second end defining a second measuring cavity, said body member having a central rail member disposed intermediate said first and second measuring cavities, said body member having at least two slots, each slot extending longitudinally about each side of said central rail member and extending into each rear wall of each respective measuring cavity, said slots being sized and adapted to allow water and detergent to penetrate within each respective measuring cavity; and
   b) a central cover member slidably mounted upon said body member, said central cover member having a first damming member extending downwardly into said first measuring cavity, said central cover member having a second damming member extending downwardly into said second measuring cavity, said central cover member having at least one flange depending therefrom for slidably engaging with said central rail member;
   c) wherein said volumes of each respective measuring cavity may be manually adjusted by sliding said central cover member along said body member.

16. An adjustable measuring device comprising:
   a) an elongate body member having dissimilarly sized measuring cavities formed at the ends thereof, said body member having a central portion disposed between said measuring cavities with the top edges of said measuring cavities and said central portion being disposed in a substantially common plane;
   b) an elongate cover member having damming members depending downwardly from opposite ends thereof, said cover member being mountable upon said body member; and
   c) a fastener formed on said cover member cooperating with said body member and said cover member to retain said cover member upon said body member and allow said cover member to slide thereon such that by sliding said cover member along said body member, the volumes of each respective measuring cavity may be selectively adjusted.

* * * * *